United States Patent

Nitzsche et al.

[11] Patent Number: 5,973,440
[45] Date of Patent: Oct. 26, 1999

[54] STRUCTURAL COMPONENT HAVING MEANS FOR ACTIVELY VARYING ITS STIFFNESS TO CONTROL VIBRATIONS

[76] Inventors: Fred Nitzsche, 210-589 Rideau St., Ottawa, Ontario, Canada, K1N 6A1; Anant Grewal, 62 Royal Oak Ct., Ottawa, Ontario, Canada, K1T 3P1; David Zimcik, 40 Byrd Cres., Kanata, Ontario, Canada, K2L 2G5

[21] Appl. No.: 08/888,600

[22] Filed: Jul. 7, 1997

[51] Int. Cl.⁶ .................................................. H01L 41/08
[52] U.S. Cl. .............................. 310/326; 310/26; 310/311
[58] Field of Search ....................................... 310/26, 326

[56] References Cited

U.S. PATENT DOCUMENTS

| | | | |
|---|---|---|---|
| 2,447,333 | 8/1948 | Hayes | 177/386 |
| 2,532,876 | 12/1950 | Asche et al. | 172/126 |
| 4,901,293 | 2/1990 | Kuhn | 310/26 |
| 5,210,653 | 5/1993 | Schell | 359/846 |
| 5,660,255 | 8/1997 | Schubert et al. | 188/378 |
| 5,701,277 | 12/1997 | Ring et al. | 367/163 |
| 5,775,715 | 7/1998 | Vandergrift | 280/602 |

FOREIGN PATENT DOCUMENTS 2 677 415  12/1992  France ................................. 310/326

*Primary Examiner*—Thomas M. Dougherty

[57] ABSTRACT

A structural component having a stiffness which can be actively varied to control vibrations, for example in a helicopter rotor, an aircraft wing or tail, or in a robotic manipulator. The component has at least one recess or notch with opposed walls, which walls, in the absence of any intervening member, tend to move relative to each other when the component is stressed. A stiffness control element is situated in the recess or notch, this element comprising electrically or magnetically expandable material capable of being rapidly expanded from a first condition in which the element is out of contact with one of the walls, to an expanded condition in which the element extends across the recess or notch and transmits forces from one of the walls to the other, thus altering the stiffness of the component. The preferred expandable material is a stack of piezoelectric crystals.

10 Claims, 5 Drawing Sheets

STRUCTURAL COMPONENT HAVING MEANS FOR ACTIVELY VARYING ITS STIFFNESS TO CONTROL VIBRATIONS

BACKGROUND OF THE INVENTION

1. Field of the Invention

The present invention provides a structural component which may be used to control vibrations in many different situations. For example, the component may be a structural member of an aircraft, a part of a helicopter rotor or rotor blade, or part of a robotic arm.

2. Prior Art

There are many situations where it is desirable to control the vibrations of a component, particularly aeroelastic deformations arising in aircraft due to phenomena such as flutter, gust response and buffeting. Also, it is often desirable to reduce the noise generated by vibrating components, such as that produced by helicopter rotors and gas turbine blades. Further, it may be required to reduce vibrations in order for parts to be positioned accurately, as in the case of robotic arms where vibrations can interfere with their precise positioning.

The invention has particular application to helicopter rotor blades. The main source of noise and vibration in helicopters is aerodynamic. Noise is generated when the tip of the blade reaches transonic speeds and shock is produced. At present, the most developed active control technique to attenuate noise and vibration in helicopter rotors is that known as "higher harmonic control" or HHC. Typically, this involve the introduction of an harmonic frequency into the helicopter blade cyclic pitch control with a phase lag such that a redistribution of the aerodynamic loads is created. Another example of HHC is described in U.S. Pat. No. 5,314,308, which issued May 24, 1994 to, Reed, and in which each blade has a slotted cylinder which rotates at a speed which is a multiple of the rotor speed. The main problem with these systems is that the vibration frequency imposed on the blades is constant, whereas the blades of a helicopter experience airspeeds and vibrational effects which differ depending on their rotational position. Experiments with HHC have found that reduction of vibration by this technique may increase noise and vice versa.

Another approach to the helicopter blade problem has been so-called "individual blade control" or IBC. With this, each blade is controlled individually. This involves an active control that introduces an harmonic signal to achieve dynamic redistribution of forces. The signal can be introduced either by a pitch applied to the blade root, a flap located near to the blade tip, or local deformation of the airfoil. The actuators proposed in the past for IBC were heavy and unsatisfactory. Recently, however, there have been various proposals to use for this purpose so-called "smart materials", i.e materials having properties controllable by electric or magnetic fields. For example, U.S. Pat. No. 5,224,826, which issued Jul. 6,1993 to Hall et al., shows the use of a deflectable flap attached to a helicopter rotor blade which is moved by piezoelectric material, in order to control vibrations transmitted from the blade to the air frame.

There have also been suggestions for dynamically controlling the bending of a component such as a helicopter rotor blade by using a "smart material" embedded or incorporated in the blade. However, hitherto these smart materials have seemed to lack the energy required to work against the aerodynamic loads encountered. In order to generate significant changes in the aerodynamic spectrum, pitch deflections of at least two degrees are necessary. The maximum pitch deflection achieved so far is less than one half of this value.

The prior art also includes proposals for counteracting vibrations in other types of components by using smart materials. For example U.S. Pat. No. 5,141,391, which issued Aug. 25,1992 to Acton et al., refers to incorporating piezoelectric or magnetostrictive materials into gas turbine engine blades to provide dynamic damping. Here too it is found that the piezoelectric material usually does not develop sufficient energy to deal with the loads met in practice. In U.S. Pat. No. 5,382,134, it is proposed to use piezoelectric material to change the stiffness of a noise radiating element; however this only changes the natural frequency of the structure, and is not suited to IBC where rapid dynamic or cyclical control of vibration characteristics are required.

The problems which occur in applying smart materials to helicopter blades and gas turbine engines also occur in other fields, especially in aircraft where aeroelastic phenomena are concerned. In the aircraft field, these materials have hitherto not been successfully used to reduce the vibrations. This is because those smart materials, such as shaped memory alloys (SMA), that have the energy (here defined as the maximum stroke multiplied by the delivered force) to overcome the work done by typical aerodynamic loads encountered in flight, present poor dynamic response; conversely, those materials that have good dynamic response (such as the piezoelectric crystal PZT, the piezoelectric film PVDF, and the electrostrictive or magnetostrictive materials) lack sufficient energy. The latter types of smart materials have high stiffness and can deliver relatively large forces, but have only a very limited stroke, i.e. approximately $300\mu$-strain for PZT and electrostrictive materials, and $1,000\mu$-strain for magnetostrictive materials. Although the stroke may be amplified by mechanical means, a corresponding reduction in the force becomes an unavoidable trade-off.

SUMMARY OF THE INVENTION

The present invention provides a new approach to the use of smart materials of the type which have rapid response times but which produce limited energy. In this invention, the smart material is used indirectly to counteract forces in a component, by being positioned to change the effective cross-section of the component and therefore its stiffness.

More specifically, in accordance with the invention, there is provided a structural component having a stiffness which can be actively varied to control vibrations, characterised by having at least one recess or notch with opposed walls, which walls, in the absence of any intervening member, tend to move relative to each other when the component is stressed. A stiffness control element is situated in the recess or notch, this element comprising electrically or magnetically expandable material capable of being rapidly expanded from a first condition in which the element is out of contact with one of the walls, to an expanded condition in which the element extends across the recess or notch and transmits forces from one of the walls to the other thus altering the stiffness of the component. The element is expandable at a rate sufficiently high to allow the stiffness of the component to be varied actively at a rate consistent with its vibrations.

Preferably, element is expandable at a rate sufficiently high to allow the stiffness of the component to be varied at a rate of at least 100 cycles per second.

The element may contain piezoelectric or electrostrictive material, and is connected to electrical means for controlling the stiffness of the component. Alternatively, the element may contain magnetostrictive material, and is connected to magnetic means for controlling the stiffness of the component.

The recess or notch may take various forms; for example it may be similar to a wide saw cut in a member subject to bending, providing a reduced cross-sectional area and having opposed walls having a gap between them which widens and narrows when the member is bent. Alternatively, it may be an area of reduced cross section in a member subjected to torque, in which the walls move laterally or parallel relative to each other but maintain a constant spacing. The only basic requirement of the recess or notch is that it should have walls which are opposed, although not necessarily parallel, and which have a tendency to move relative to each other when the component or member is stressed, so that the stiffness of the component is varied when the element is expanded to fill the gap between the walls. The notch will generally be positioned to interrupt lines of stress force in the member.

Unlike in prior art applications of smart materials, the work delivered by the material is orthogonal to the work delivered by the external loads, and only comprises the work necessary to "seal" the gap. Therefore, control over the external loads is achieved indirectly, by inserting and removing the control element having the material from the load path. Effectively, the system actively varies the moment of inertia of the component, and provides temporal variations in the mechanical impedance.

Where it is desired to control vibrations in a component subjected to torque, the control element has a first end fixed to a first wall of the recess or notch, and has its second end engageable with the second wall of the recess, and the second end and/or the second wall are preferably provided with friction enhancing surfaces so that forces parallel to the walls can be transmitted between the element second end and the second wall, so that the element, when expanded, significantly increases the torsional stiffness of the component. Such friction enhancing surfaces may include interengaging teeth which positively stop any lateral movements between the walls.

The arrangements so far described provide two levels of stiffness for a component, depending on whether or not the control element bridges the gap between the walls. A greater degree of control can be provided by using several such control elements which are individually controlled so that one, two or more such elements can be used to bridge the gap between the walls one after the other to give progressive increases in stiffness, movements of these elements being controlled to give the component a stiffness which is cyclically varied to give optimum damping of vibrations.

BRIEF DESCRIPTION OF THE DRAWINGS

Preferred embodiments of the invention will now be described by way of example with reference to the accompanying drawings, in which;

FIGS. 2a and 2b show enlarged, fragmentary details of alternative constructions for part of the structural component of FIG. 2;

DETAILED DESCRIPTION

Figure 1:
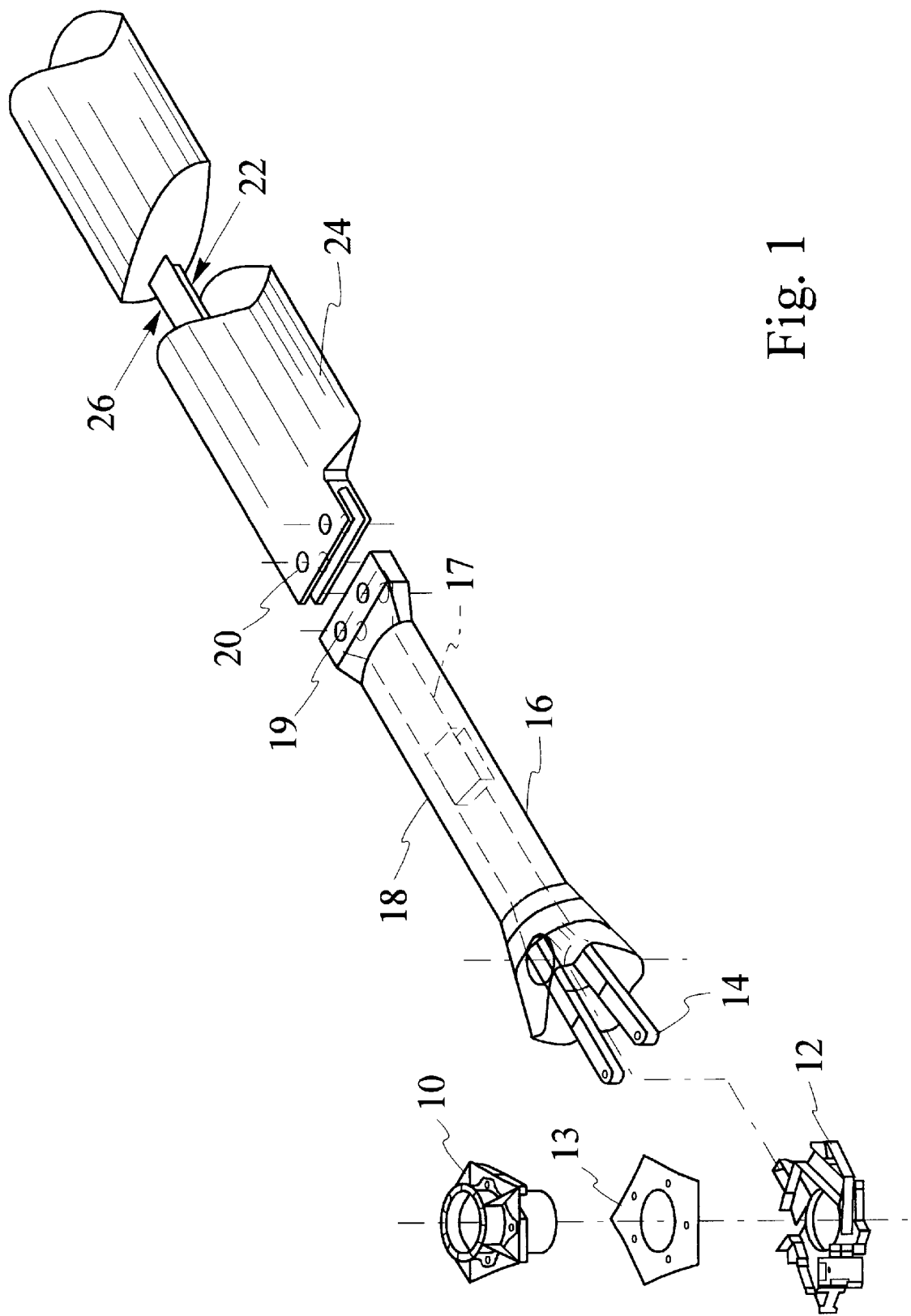
FIG. 1 is an exploded view of a helicopter rotor which incorporates two structural components in accordance with this invention.
Figure 2:
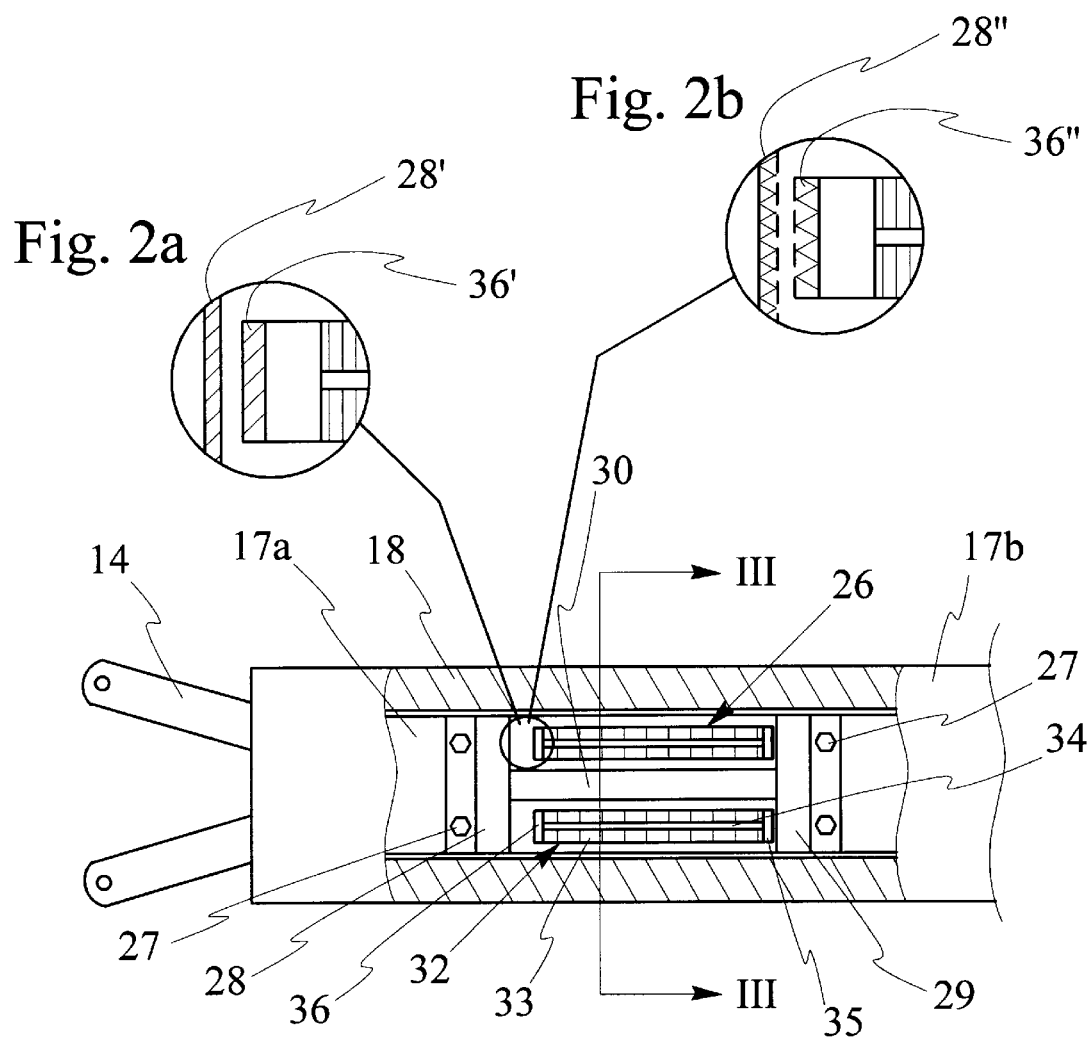
FIG. 2 is a top plan view of a portion of the helicopter rotor, cut-away to show the structural component in more detail.
Figure 3:
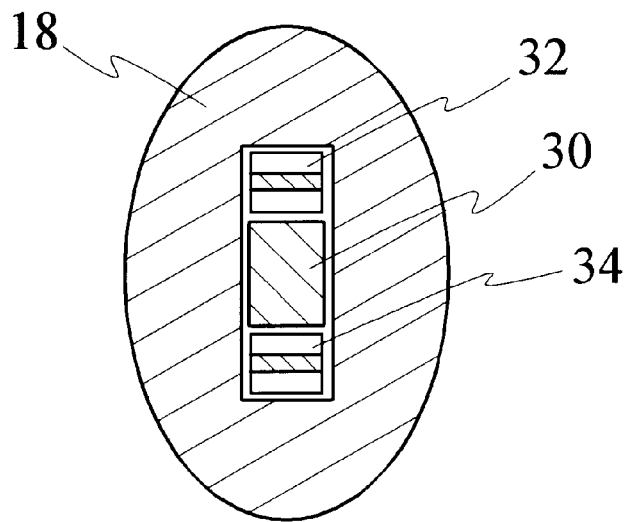
FIG. 3 is a cross-sectional view on lines 3—3 of FIG. 2.
Figure 4:
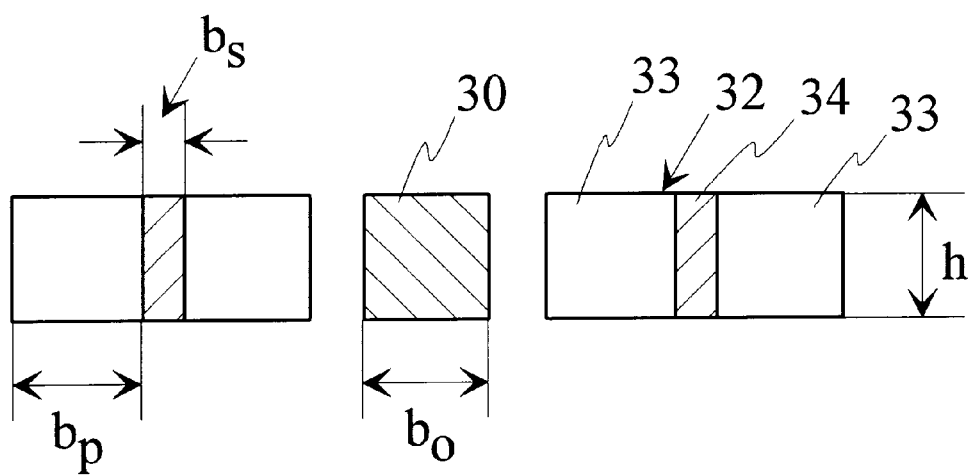
FIG. 4 is an enlarged cross-sectional view of the main parts of the control element.

Referring FIG. 1, this shows a helicopter rotor having upper and lower hub fittings 10 and 12, between which is a hub plate 13. These parts have bolts holes by which the bifurcated ends 14 of a flexbeam 16 are connected to the hub, this flexbeam being, in the main, a core formed as a beam 17 of rectangular cross-section with a casing or covering 18. Both the beam and the covering may be formed of metal, preferably aluminum, but may also be a composite, fiber reinforced, material. The outer end of this beam has a flat plate 19 with bolt holes suitable for fitting into a groove formation 20 in the end of the main spar 22 of the rotor. The main spar is a beam of rectangular cross-section, formed of metal or composite material, having a covering or casing 24 of airfoil shape which may also be of metal or a composite.

Both the flexbeam core 17 and the main spar 22 incorporate, at about their centers, structural components 26 in accordance with the invention; these are herein referred to as "smart springs" to indicate that they are components having a stiffness which can be controlled very rapidly by electrical signals.

FIGS. 2, 2a, 2b, 3 and 4 show details of the component 26 and its connection to inner and outer portions of the beam 17. As shown, this has an inner portion 17a and an outer portion 17b, the facing ends of which are fixed or clamped, for example by being held by bolts 27, to end plates 28 and 29 forming respectively the inner and outer ends of the component. These end plates are connected by a torsion member 30 which is strongly fixed to the end plates so as to be capable of transmitting the torque forces experienced by the rotor back to the hub. Suitably, the member 30 is of aluminum having a rectangular, and almost square, cross section.

The amount of twisting experienced by the torque member 30 is controlled by two expandable control elements 32, which may be identical, and which extend from the end plate 29 and have outer ends close to the plate 28. Each comprises two parallel stacks of about 40 piezoelectric crystals or layers 33. The two adjacent stacks are each held in place by a central aluminum support plate 34 having an inner end flange 35 welded to the end plate 29 and having an outer end flange 36 which abuts the outer end of the stack of elements and holds these at all times in compression. Suitable piezoelectric elements are known as PZT crystals, and these are pre-compressed between the flanges 35 and 36 when they are inactive. As shown in FIG. 2a, the outer faces of flanges 36, and the cooperating inner face of plate 28, are provided with a friction enhancing material such as 28', 36' such as aluminum or brass which have suitably high friction. Tine crystals 33 are capable of expanding the stacks 32, overcoming the tension in support plate 34, to bring the surfaces of flanges 36 into engagement with the inner faces of plate 28. The stacks 32 are stiff enough in bending and shear, and the friction between the faces of flanges 36 and the plate 28 is sufficient, that this effect significantly alters the torsional stiffness of the component 26.

The two control elements 32 have electrodes applied to opposite ends of the stacks of crystals 33, and are individually controlled so that the stiffness of the component can be controlled in stages. The control elements have their length varied according to a square wave control algorithm, at a rate suitable for dealing with vibrations in a helicopter rotor. A stiffness variation at about 4/rev or 5/rev may be suitable for this; the rate of variation for such rotors will usually be less than 100 Hz. It is contemplated, however, that a similar system may be used for noise control, in which case stiffness variation at around 1000 Hz or more may be used.

It is also possible to use more than two stiffness control elements, to give specially designed variations of stiffness with time to meet particular situations.

A version of the control element as described has been simulated with a model helicopter rotor. The design parameters were as follows:

| | |
|---|---|
| PZT charge coefficient ($d_{33}$): | $285 \times 10^{-12}$ C/N |
| Length of PZT stack (l) | 20 cm |
| Number of layers in the PZT stack | 40 |
| Amplification factor | 10 |
| Maximum allowable PZT field | $1.0 \times 10^6$ V/m |
| Maximum free strain in PZT stack | $285\mu$ |
| Gap length ($\Delta l$) | $330\mu = 0.013"$ |
| PZT Young's modulus | $67 \times 10^9$ N/m$^2$ |
| Original structure, substructure Young's modulus (aluminum) | $71 \times 10^9$ N/m$^2$ |
| Shear modulus (PZT, original structure & substructure) | $26.2 \times 10^9$ N/m$^2$ |
| Height (thickness) of composite structure (h) | 7 cm |
| Width of original structure ($b_o$) | 7 cm |
| Width of PZT ($b_p$) | 0.8 cm |
| Width of substructure ($b_s$) | 0.1 cm |
| Maximum aerodynamic pitch moment | 30 N.m |
| Static friction coefficient (clean surfaces) | 0.4 |
| Baseline shear stiffness | $8.86 \times 10^4$ N.m$^2$ |
| The component or "smart spring" was found to have characteristics as follows: | |
| Elongation of control element 32 | $330.9\mu$ |
| Original structure elongation | $0.9\mu$ |
| Final gap length | $0\mu$ (closed) |
| Control element contact force | 815 N |
| Maximum shear stress at contact surface | $2.64 \times 10^5$ N/m$^2$ |
| Shear stress for slippage under the maximum external load | $2.74 \times 10^5$ N/m$^2$ |
| Maximum shear stiffness | $18.17 \times 10^4$ N/m$^2$ |
| Maximum shear stiffness/baseline shear stiffness | 2.05 |

During tests on the model helicopter rotor, in the first phase no active control was introduced and the blade aerodynamic loads were measured. The aerodynamic pitch moment during one cycle varied between 20 N.m and −30 N.m. Preliminary calculations indicated that a reduction of at least one order of magnitude in power-spectral-density level at the critical frequency of 4/rev can be achieved with a control element or "smart spring" varying its torsion stiffness harmonically at 5/rev (87.5 Hz) with an amplitude of 70% with respect to the baseline value. Calculations also indicated that such a "smart spring" is realizable using a typical stacked piezoelectric material arranged as described. In the tested device, the length of the stack was 20 cm, whereas for the full scale rotor the length of the stack would be about 50 cm.

The development model relied on contact friction to seal the gap and to keep it closed under the maximum aerodynamic pitch moment, and provide load path continuity; this was found sufficient in the tests. A better sealing performance could be obtained if the surfaces in contact, i.e. the surfaces of parts 28 and 36, were to be constructed with teeth to provide full mechanical engagement. This solution requires, however, a larger gap although the contact force required is much lower. Such a design might use actuators made of a smart material with larger maximum stroke like Terfenol-D (an alloy of terbium, dysprosium, and iron), which is a magnetostrictive material.

Figure 5:
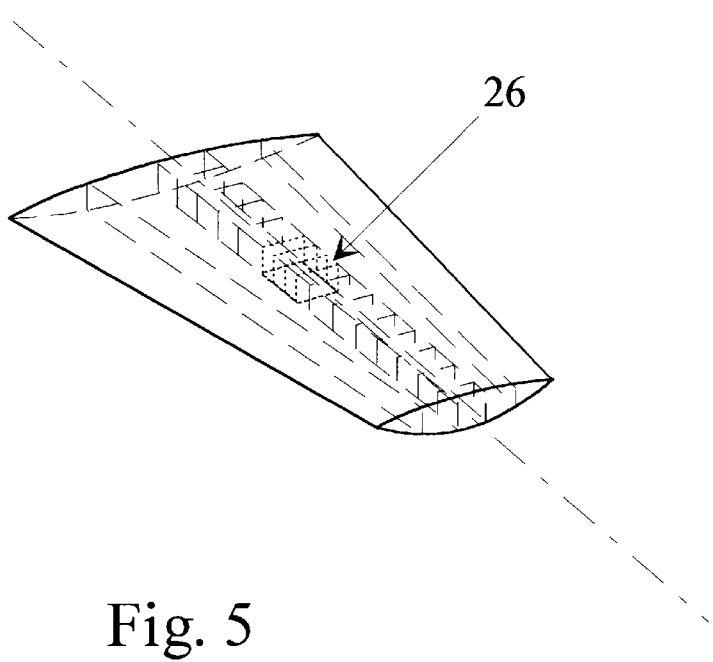
FIG. 5 is a diagrammatic view of an airplane wing showing a proposed location for the component of the invention.
Figure 6:
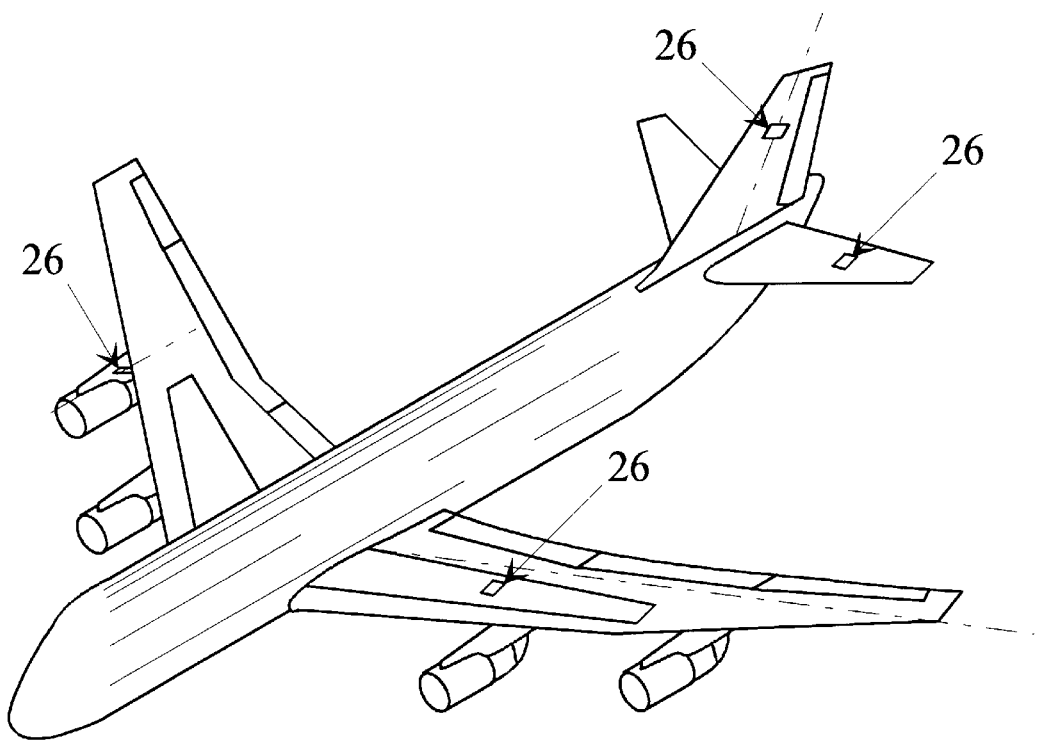
FIG. 6 is a view of an airplane showing more locations where the component of the invention can be used.
Figure 7:
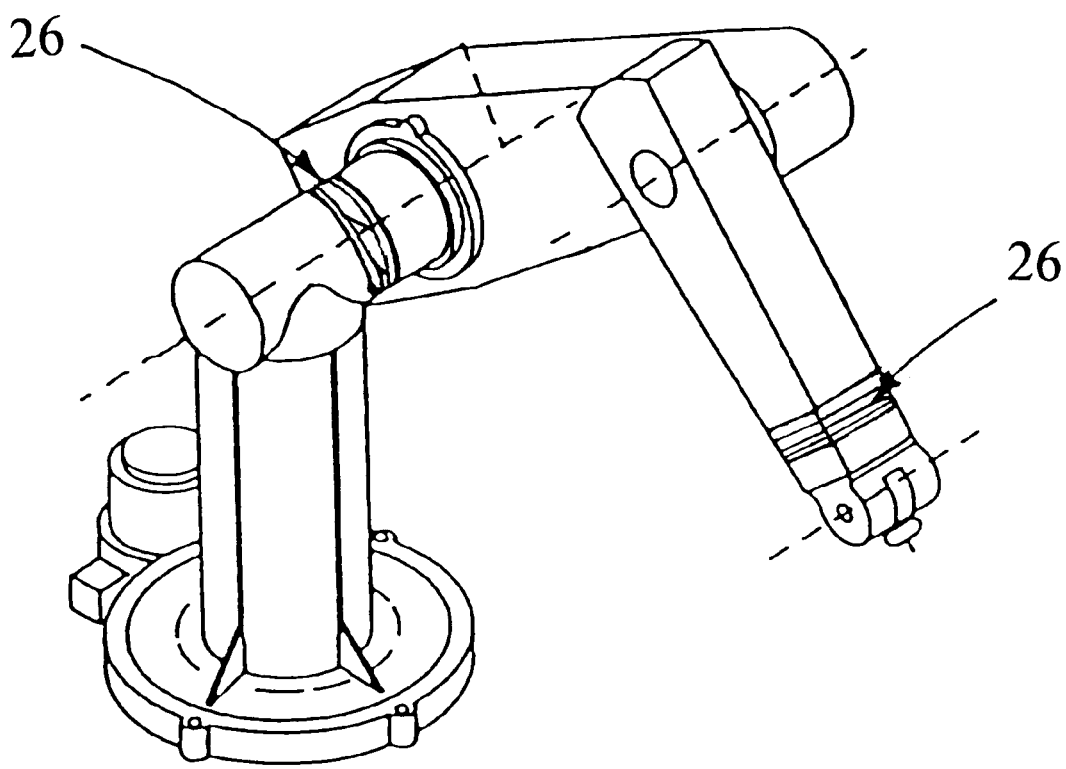
FIG. 7 is a view of a robot arm showing further possible locations for the component of the invention.

FIG. 5 shows the possible use of a similar variable torque component or "smart spring" 26 to replace a section of an aircraft wing spar, for reducing vibrations in the wing. FIG. 6 indicates diagrammatically other locations where such a device may be used to reduce vibrations, for example in aircraft engine pylons and in tail components. FIG. 7 indicates how the variable torque components may be incorporated into the arms of a robotic manipulator, to reduce its vibrations and to improve the precision with which such manipulators can operate.

We claim:

1. A structural component having a stiffness which can be actively varied to control vibrations, characterised by having at least one recess or notch with opposed walls, which walls, in the absence of any intervening member, tend to move relative to each other when the component is stressed, and having a stiffness control element situated in the recess or notch, this element comprising electrically or magnetically expandable material capable of being rapidly expanded from a first condition in which the element is out of contact with one of said opposed walls, to an expanded condition in which the element extends across the recess or notch from one of said walls to the other and transmits forces from one of the walls to the other, thus altering the stiffness of the component.

2. A structural component according to claim 1, wherein the element is expandable at a rate sufficiently high to allow the stiffness of the component to be varied at a rate of at least 100 Hz.

3. A structural component according to claim 1, wherein the element is expandable at a rate sufficiently high to allow the stiffness of the component to be varied at a rate of at least 1000 Hz.

4. A component according to claim 1, wherein said element contains piezoelectric material, and is connected to electrical means for controlling the stiffness of the component.

5. A component according to claim 1, wherein said element contains electrostrictive material, and is connected to electrical means for controlling the stiffness of the component.

6. A component according to claim 1, wherein said element contains magnetostrictive material, and is connected to magnetic means for controlling the stiffness of the component.

7. A component according to claim 1, wherein a plurality of said stiffness controlling elements are situated in said recess, said elements being individually controlled and expandable to provide several degrees of stiffness for the component.

8. A component according to claim 1, wherein said opposed walls are oriented so as to move parallel to each other when the component is subjected to varying torsional strains, and wherein said element has a first end fixed to a first of said opposed walls of the recess, and has its second end engageable with the second opposed wall of the recess, said second end and said second wall including friction enhancing surfaces so that forces parallel to said walls can be transmitted between said second end and the second opposed wall, whereby said element significantly increases the torsional stiffness of the component when expanded to bring the second end into contact with said second wall.

9. A component according to claim 1, wherein said opposed walls are oriented so as to move parallel to each other when the component is subjected to varying torsional strains, and wherein said element has a first end fixed to a first of said opposed wall of the recess, and has its second end engageable with the second opposed wall of the recess, said second end and said second wall including interengaging teeth so that forces parallel to said walls can be transmitted between said second end and the second opposed wall, whereby said element significantly increases the torsional stiffness of the component when expanded to bring the second end into contact with said second wall.

10. A helicopter rotor incorporating a component according to claim 1.

* * * * *